(12) United States Patent  
Wang et al.

(10) Patent No.: US 10,665,111 B2  
(45) Date of Patent: May 26, 2020

(54) PORTABLE DATALINK EQUIPMENT FOR OVERHEARING DATA OR VOICE COMMUNICATIONS

(71) Applicants: Honeywell International Inc., Morris Plains, NJ (US); Haiming Wang, Beijing (CN); Yi Zhong, Shanghai (CN); Zhenning Zhou, Shanghai (CN)

(72) Inventors: Haiming Wang, Beijing (CN); Yi Zhong, Shanghai (CN); Zhenning Zhou, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 55 days.

(21) Appl. No.: 15/525,577

(22) PCT Filed: Aug. 1, 2016

(86) PCT No.: PCT/CN2016/092668  
§ 371 (c)(1),  
(2) Date: May 9, 2017

(87) PCT Pub. No.: WO2018/023330  
PCT Pub. Date: Feb. 8, 2018

(65) Prior Publication Data  
US 2018/0293899 A1  Oct. 11, 2018

(51) Int. Cl.  
*G08G 5/00* (2006.01)  
*H04B 7/185* (2006.01)  
(Continued)

(52) U.S. Cl.  
CPC ........... *G08G 5/0013* (2013.01); *G08G 5/006* (2013.01); *G08G 5/0021* (2013.01);  
(Continued)

(58) Field of Classification Search  
CPC .... G08G 5/006; G08G 5/0021; G08G 5/0013; G10L 15/00; H04B 7/18506;  
(Continued)

(56) References Cited

U.S. PATENT DOCUMENTS 7,142,854 B1 * 11/2006 Kauffman .......... B64D 45/0015  
　　　　　　　　　　　　　　　455/431  
8,200,378 B1   6/2012 Chiew et al.  
(Continued)

FOREIGN PATENT DOCUMENTS

| CN | 104346022 | 2/2015 |
| WO | 2016073422 | 5/2016 |

OTHER PUBLICATIONS

International Search Authority, "The International Search Report and Written Opinion for PCT/CN2016/092668", dated Apr. 25, 2017, pp. 1-11, Published in: WO.  
(Continued)

*Primary Examiner* — Hai Phan  
*Assistant Examiner* — Anthony D Afrifa-Kyei  
(74) *Attorney, Agent, or Firm* — Fogg & Powers LLC

(57) ABSTRACT

A system for overhearing data or voice communications is provided. The system comprises at least one antenna operative to receive messages comprising data messages or voice messages, or both data and voice messages. A radio unit is in communication with the at least one antenna, with the radio unit operative to receive signals corresponding to the messages from the at least one antenna. A processor unit is in communication with the radio unit, with the processor unit operative to process the signals corresponding to the messages. A display unit is in communication with the processor unit, with the display unit operatively enabled in  
(Continued)

response to the signals corresponding to the messages. The display unit is operative to show the messages in a text format or a graphics format.

18 Claims, 7 Drawing Sheets

(51) Int. Cl.
  *H04B 1/00* (2006.01)
  *G10L 15/00* (2013.01)
(52) U.S. Cl.
  CPC ....... *H04B 1/0003* (2013.01); *H04B 7/18506* (2013.01); *G10L 15/00* (2013.01)
(58) Field of Classification Search
  CPC .. H04M 1/7255; H04M 1/247; H04M 1/2477; H04M 3/53333; H04M 2201/42; H04M 2201/60; H04M 2203/253; H04M 2250/74
  See application file for complete search history.

(56) References Cited

U.S. PATENT DOCUMENTS

| | | | |
|---|---|---|---|
| 8,364,328 B2 | 1/2013 | Hedrick | |
| 8,878,872 B1 | 11/2014 | Raghu et al. | |
| 9,141,830 B2 | 9/2015 | Uczekaj et al. | |
| 2002/0007234 A1* | 1/2002 | Heppe | H04B 7/18506 701/10 |
| 2005/0202785 A1* | 9/2005 | Meyer | H04B 7/18506 455/66.1 |
| 2005/0205785 A1* | 9/2005 | Hornback | G01J 5/22 250/332 |
| 2005/0273330 A1 | 12/2005 | Johnson | |
| 2009/0058682 A1 | 3/2009 | True | |
| 2009/0103473 A1* | 4/2009 | Foster | H04B 7/18506 370/316 |
| 2009/0134981 A1* | 5/2009 | Shafaat | G08G 5/0008 340/313 |
| 2009/0298474 A1* | 12/2009 | George | G10L 13/00 455/412.2 |
| 2010/0172328 A1* | 7/2010 | McGuffin | H04B 7/18506 370/332 |
| 2011/0137998 A1* | 6/2011 | Judd | G08G 5/0013 709/206 |
| 2011/0276198 A1* | 11/2011 | Khatwa | G01C 23/00 701/3 |
| 2012/0078448 A1* | 3/2012 | Dorneich | G08B 21/06 701/3 |
| 2012/0190344 A1 | 7/2012 | Yen | |
| 2013/0131897 A1* | 5/2013 | Simon | G05D 1/0816 701/14 |
| 2013/0346081 A1* | 12/2013 | Loubiere | G08G 5/0013 704/260 |
| 2015/0033151 A1 | 1/2015 | Lim | |
| 2015/0081292 A1* | 3/2015 | Populus | G10L 15/26 704/235 |
| 2017/0039858 A1* | 2/2017 | Wang | G10L 25/51 |

OTHER PUBLICATIONS

Dan Pendergast, "Connecting EFBs Over Inmarsat", "http://www.inmarsat.com/wp-content/uploads/2013/10/Inmarsat_APC_2013_09_Dan_Pendergast.pdf", 2013, pp. 1-17, Publisher: Inmarsat.
European Patent Office, "Partial Supplementary European Search Report from EP Application No. 16910928.7", from Foreign Counterpart to U.S. Appl. No. 15/525,577, dated Feb. 25, 2020, pp. 1-15, pp. 1-15, Published: EP.

* cited by examiner

PORTABLE DATALINK EQUIPMENT FOR OVERHEARING DATA OR VOICE COMMUNICATIONS

This application claims priority to International Application No. PCT/CN2016/092668 filed on Aug. 1, 2016.

BACKGROUND

Datalink equipment is commonly used on commercial and business aircraft for data communications, but is not available in some areas around the world for general aviation (GA) or for air transportation and regional (ATR) aircraft. In the United States, GA and ATR aircraft are able to receive broadcasting data via the Flight Information System-Broadcast (FIS-B), which broadcasts data containing important information such as weather reports, Significant Meteorological Information (SIGMET), or Notice to Airmen (NOTAM). In some other regions around the world, the FIS-B is not as popular, or the broadcast band is controlled by the government and not available. Nevertheless, GA and ATR aircraft in these other regions also need to know weather information, or the newest flight information from the ground to avoid potential unsafe operation or landing conditions.

SUMMARY

A system for overhearing data or voice communications is provided. The system comprises at least one antenna operative to receive messages comprising data messages or voice messages, or both data and voice messages. A radio unit is in communication with the at least one antenna, with the radio unit operative to receive signals corresponding to the messages from the at least one antenna. A processor unit is in communication with the radio unit, with the processor unit operative to process the signals corresponding to the messages. A display unit is in communication with the processor unit, with the display unit operatively enabled in response to the signals corresponding to the messages. The display unit is operative to show the messages in a text format or a graphics format.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
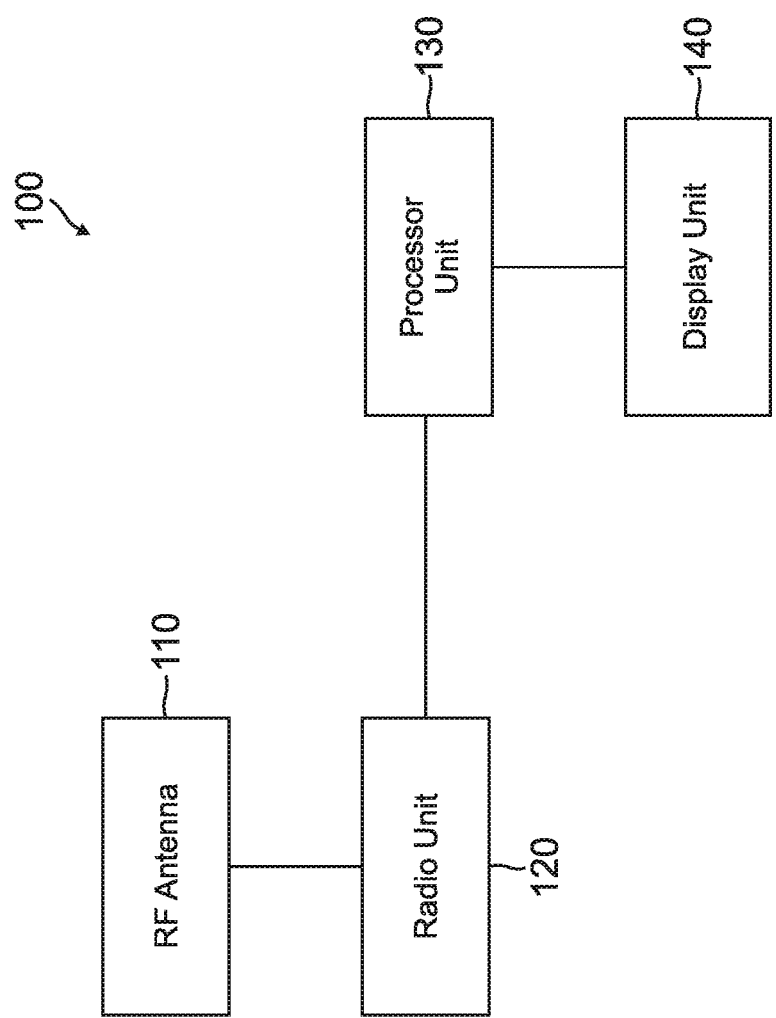
FIG. 1 is a block diagram of a system for overhearing data or voice communications, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods for providing efficient, portable datalink equipment with overhearing of messages over very high frequency (VHF), satellite communications (SATCOM), high frequency (HF), or other media bands are described herein. In general, a datalink connection and data application system for overhearing is provided, along with a message and/or voice enabled display in a portable display unit such as a mobile computing device.

In general, a system for overhearing data or voice communications comprises at least one antenna operative to receive data messages and voice messages, a radio unit operative to receive signals corresponding to the data messages and the voice messages from the antenna, a processor unit operative to process the signals corresponding to the data messages and the voice messages, and a display unit operatively enabled in response to the signals corresponding to the data messages and the voice messages.

In one embodiment, the antenna, radio unit, processor unit, and display unit are all implemented in a mobile computing device, such as a tablet computer (e.g., iPad), or other personal device. In this embodiment, the antenna can be built into the mobile computing device, and the radio unit is a dedicated software defined radio (SDR) residing on the mobile computing device.

In another embodiment, the radio unit can be an external radio, such as a VHF radio, a SATCOM radio, or an HF radio, which is connected to a mobile computing device through a selectable interface. In this embodiment, the mobile computing device includes the processor unit and display unit.

In some embodiments, a switchable radio frequency (RF) antenna unit can be employed that includes control logic for situational switching between at least two antennas based on a geographical or interference scenario. The switchable RF antenna unit includes at least one external relay antenna and at least one equipment antenna coupled to the radio unit.

The display unit in the mobile computing device is configured to provide various display enhancement features. For example, the received message can be displayed and overlaid on a geographical map to enhance a real map shown on a screen of the display unit. In addition, voice information received via the radio can be recognized to enable a specific display. For example, a voice command can be recognized and visually displayed, either in text or graphical format, and then trigger some enhanced display, such as specific pop-up message. The displayed message can be classified to different categories and shown in different formats, such as a different color, different twinkling effects, and the like. In one example, if there is forbidden airspace information from a voice message, which can be recognized by an embedded algorithm, then a graphical area will be plotted to indicate the forbidden airspace in a displayed geographical map.

An information message enhancement protocol can be implemented using an embedded algorithm that is configurable to overhear a message in a specific sky area, for a specific aircraft, and specific message type. For example, in terms of a real flying scenario and situation, the embedded algorithm can overhear the message in a specific sky area, such as a traditional area during the flight history and/or the stored sensible area before the flight. A ground station can provide the specific aviation message that is broadcast for the specific sky area.

In one embodiment, a verification and safety enhancement protocol can be provided. For example, priority decision and cross check logic between a received datalink message and a received VHF voice message can be implemented. The cross check logic can decide which message should be followed, or can trigger a report to a ground station for further decision. If there is a minor mismatch between a voice message and a text message, the cross check logic can indicate that the voice message should be trusted, or a "confirmation" message can be sent to the ground station to verily which message should be trusted.

The present systems and methods provide a cost-effective datalink implementation, which is particularly beneficial for general aviation (GA) aircraft, or air transportation and regional (ATR) aircraft. The present methods provide a way to display Notice to Airmen (NOTAM), air traffic control (ATC), and weather information graphically with minimal cost, and allow for a non-certified application to be used in the portable display unit.

In one embodiment, a communications management unit (CMU) implemented in a mobile computing device such as a tablet computer is connected with an external aviation or aeronautical radio, such as a portable VHF radio or an onboard VHF radio, to receive datalink messages from a ground station or other aircraft. This configuration is useful in a GA datalink solution, for example. In another embodiment, a dedicated software defined radio (SDR) can replace the external aviation or aeronautical radio for the signal input to the CMU, with the SDR residing on the same tablet computer as the CMU. This configuration is useful in an ATR datalink solution, for example. In other embodiments, information can be sent from an onboard aviation CMU to an onboard aviation radio tuned to an appropriate frequency for transmission of the information to a mobile computing device.

When the present approach is implemented in an aircraft fleet, having master and slave communications systems, the slave system would overhear a master message via the aviation radio. In a specific season, the aviation radio in the aircraft may be used to monitor weather information, helping to identify hazardous weather and avoid any disasters.

Further details of the present systems and methods are described hereafter with reference to the drawings.

FIG. 1 illustrates a system 100 for overhearing data or voice communications, according to one embodiment. The system 100 generally comprises at least one radio frequency (RF) antenna 110 that is configured to receive data or voice messages from various sources. A radio unit 120 is in communication with RF antenna 110 and is operative to receive signals corresponding to the data or voice messages. The radio unit can be a VHF radio, a SATCOM radio, or an HF radio, for example. A processor unit 130 is in communication with radio unit 120 and is operative to process the signals corresponding to the data or voice messages. A display unit 140 is in communication with processor unit 130 and is operatively enabled in response to the signals corresponding to the data or voice messages. The display unit 140 is operative to show the data or voice messages in a text or graphics format with enhanced features, as described further hereafter.

In one embodiment, processor unit 130 is operative to execute an information message enhancement protocol using an embedded algorithm that is configurable to overhear a data or voice messages this is: for a specified sky area and broadcast from a ground station; from a specified aircraft other than where the processor unit resides; from an aircraft where the processor unit resides; or a specific message type. Examples of specific message types include ARINC 618 messages, ARINC 623 air traffic service (ATS) messages, NOTAM messages, meteorological aviation report (METAR) messages, airport terminal information services (ATIS) messages, or airline unique messages defined by a database. The processor unit is also configured to automatically determine an appropriate frequency for receiving the message by using current position information, and to tune the radio unit to the appropriate frequency.

Figure 2:
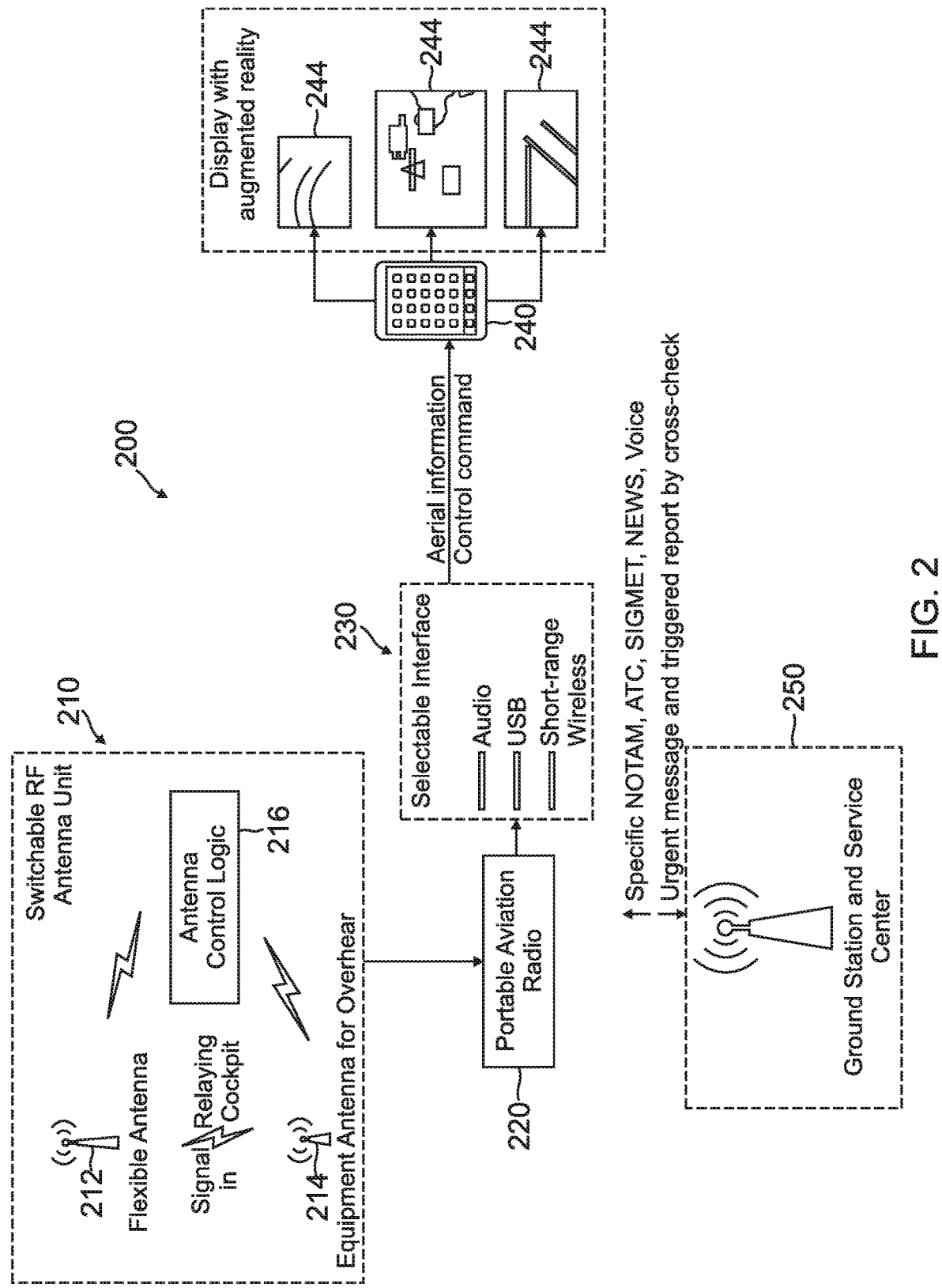
FIG. 2 is a block diagram of an exemplary implementation of a system for overhearing data or voice communications in an aircraft.

FIG. 2 illustrates an exemplary, implementation of a system 200 for overhearing data or voice communications in an aircraft. In this implementation, a switchable RF antenna unit 210 is utilized that includes at least one relay antenna 212, such as a flexible antenna embedded in cockpit glass of an aircraft, and at least one equipment antenna 214, which is coupled with a radio receiver in a portable aviation radio 220, such as a VHF radio. In an alternative embodiment, aviation radio 220 can be an onboard aviation radio such as a VHF radio installed in the aircraft.

An antenna control module 216 is in operative communication with relay antenna 212 and equipment antenna 214, providing control logic for situational switching between relay antenna 212 and equipment antenna 214 based on a geographical or interference scenario. For example, in an area where equipment antenna 214 has good signal receiving performance, relay antenna 212 can be switched off to minimize wireless interference of a signal relaying in the cockpit environment. In an area where equipment antenna 214 has poor signal receiving performance, relay antenna 212 can be switched on to relay the received signal to equipment antenna 214.

A selectable interface 230 is in communication with aviation radio 220 and is operative to transmit signals corresponding to the data or voice messages. As depicted in FIG. 2, selectable interface 230 provides a communication connection between aviation radio 220 and a mobile computing device 240. The communication connection can be an audio connection, a universal serial bus (USB) connection, or a short-range wireless connection, for example. The mobile computing device 240 can be a tablet computer, or other portable personal device having a display screen.

The mobile computing device 240 includes a display operative to show any received data messages or voice messages in an augmented reality format 244, such as an overlay on a geographical map. In another example, a voice message received by aviation radio 220 is recognized by a processor in mobile computing device 240, which directs the display to show information from the voice message in a specified format.

In one embodiment, mobile computing device 240 includes an aviation communication management unit (CMU), which is configured to process signals from aviation radio 220 that correspond to datalink messages, and direct the processed signals to the display to show representations of the datalink messages in text or graphics format.

As illustrated in FIG. 2, a ground station and service center 250 broadcasts specific aerial information, such as weather reports including Significant Meteorological Information (SIGMET) reports, NOTAM reports, Air Traffic Control (ATC) information, and news reports, as well as voice communications. The broadcasted aerial information and voice communications is received by aviation radio 220 through switchable antenna unit 210, and sent to mobile computing device 240 through selectable interface 230 for display.

In addition to aerial information and voice reception from aviation radio 220 via selectable interface 230, a control command message can be exchanged over selectable interface 230, such as commands to change the communication frequency and mode of aviation radio 220. For example, a frequency tuning command can be sent via an audio interface. In case of a cockpit emergency situation, aviation radio 220 may be used to trigger an urgent message, such as an emergency report by cross-check, to ground station and service center 250.

Figure 3:
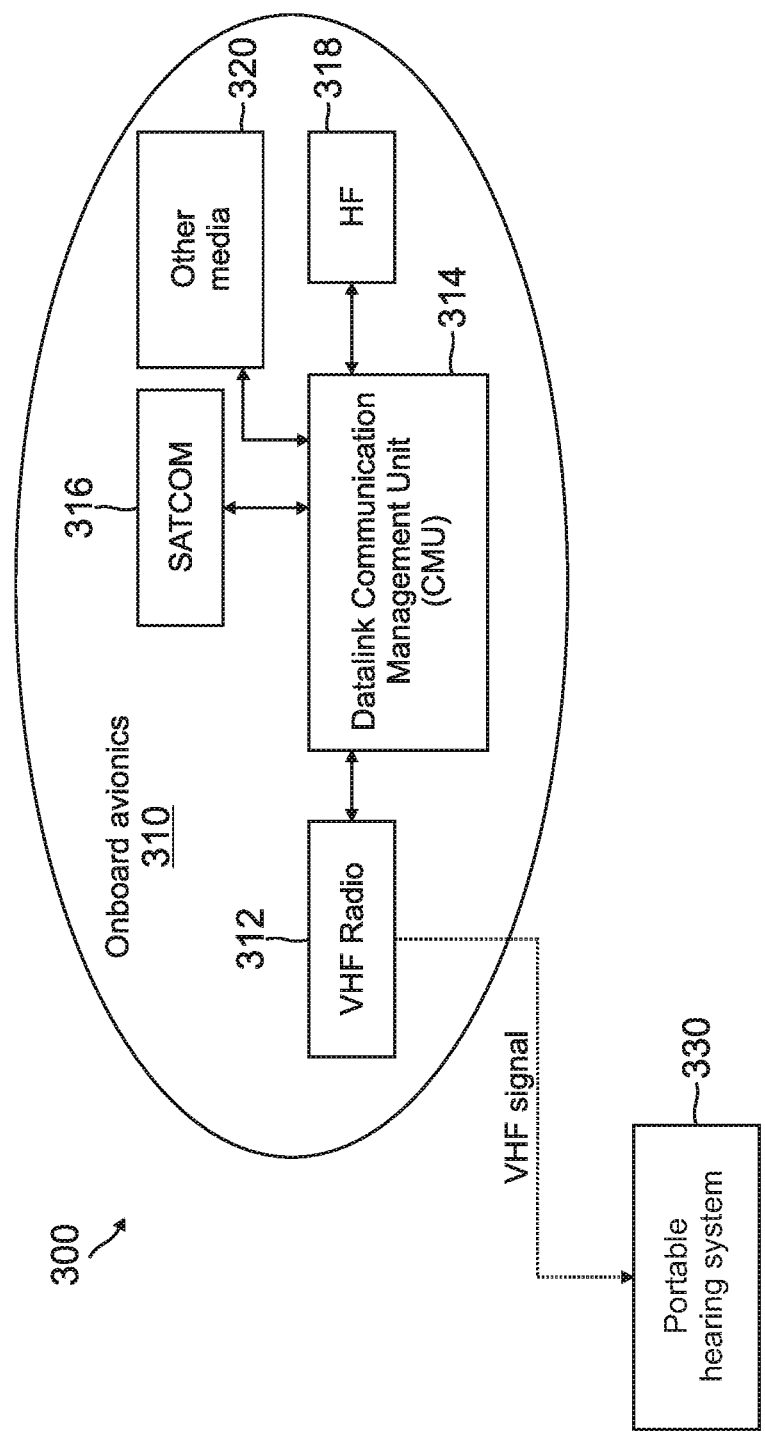
FIG. 3 is a block diagram of another exemplary implementation of a system for overhearing data or voice communications in an aircraft.

FIG. 3 illustrates an exemplary implementation of a system 300 for overhearing data or voice communications in an aircraft, according to another embodiment. In system 300, an onboard avionics system 310 includes an onboard aviation radio 312 such as a VHF radio, and an onboard aviation datalink CMU 314 in operative communication with aviation radio 312. The CMU 314 is configured to receive satellite communications (SATCOM) signals from a SATCOM receiver 316, high frequency (HF) signals from an HF receiver 318, or other media signals from one or more other media receivers 320. The SATCOM signals, HF signals, or other media signals are processed and sent from CMU 314 to aviation radio 312 for transmission. The aviation radio 312 can be operatively coupled to a switchable RF antenna unit, such as described previously, to receive data or voice messages from a ground station.

A portable hearing system 330 includes various components as described previously, such as a selectable interface that communicates with a mobile computing device (e.g., tablet computer). During operation, a signal such as a VHF signal is transmitted from aviation radio 312 to portable hearing system 330 for processing and display of information from various sources on the mobile computing device, such as information from received SATCOM signals, HF signals, other media signals, or a ground station. In addition, information can be processed and sent from CMU 314 itself (e.g., current route/flight plan) via aviation radio 312, tuned to an appropriate channel, for processing and display of the information on portable hearing system 330.

Figure 4:
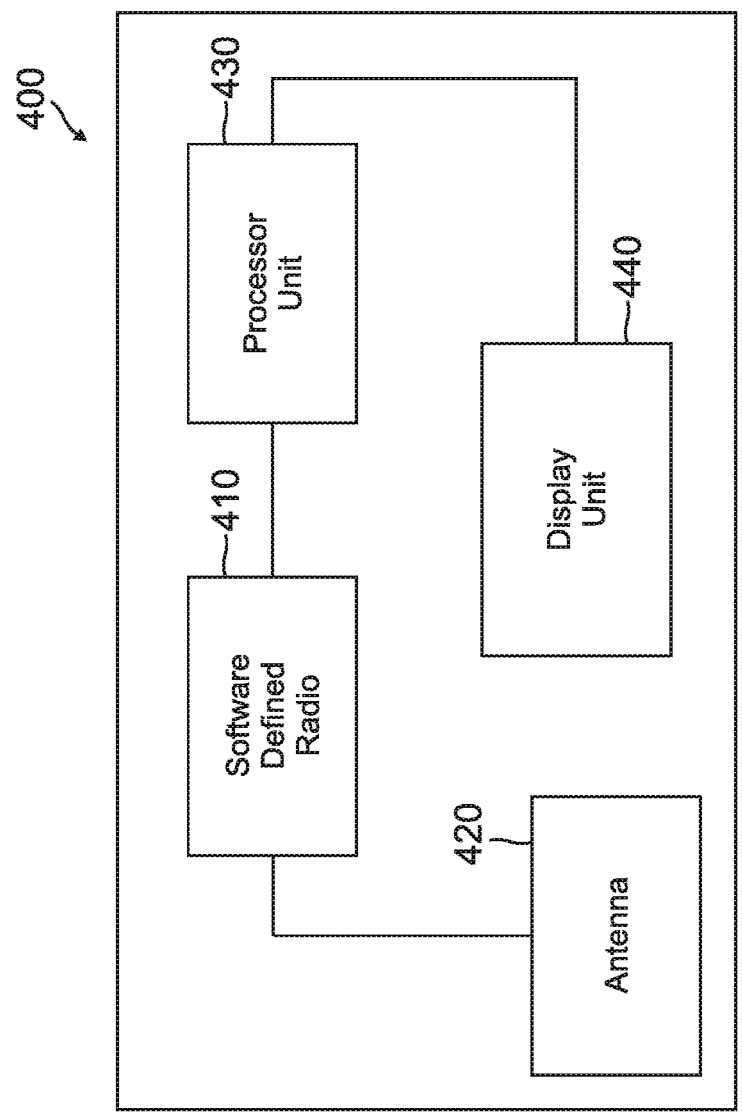
FIG. 4 is a block diagram of a system for overhearing data or voice communications, according to another embodiment.

FIG. 4 illustrates a system 400 for overhearing data or voice communications, according to another embodiment. The system 400 comprises a software defined radio 410 operative to receive signals corresponding to data messages and voice messages from at least one built in antenna 420. A processor unit 430 is in communication with software defined radio 410 and is operative to process the signals corresponding to the data or voice messages. A display unit 440 is in communication with processor unit 430 and is operatively enabled in response to the signals corresponding to the data or voice messages. The display unit 440 is operative to show the data or voice messages in a text format or a graphics format, with various enhanced features such as augmented reality.

The system 400 can be implemented in mobile computing device, such as a tablet computer (e.g., iPad) or other personal device. In one implementation, system 400 can be configured for overhearing data or voice communications in an aircraft. In this implementation, software defined radio 410 is operative to receive signals in an aviation bandwidth, and processor unit 430 comprises an aviation CMU.

The foregoing systems for overhearing communications can be configured such that a processor in these systems is configured to execute a verification and safety enhancement protocol using an embedded algorithm that includes priority decision and cross check logic between a received data message and a received voice message. This provides a decision on which of the received messages to follow, or triggers a report that is sent to a ground station for a further decision.

Figure 5:
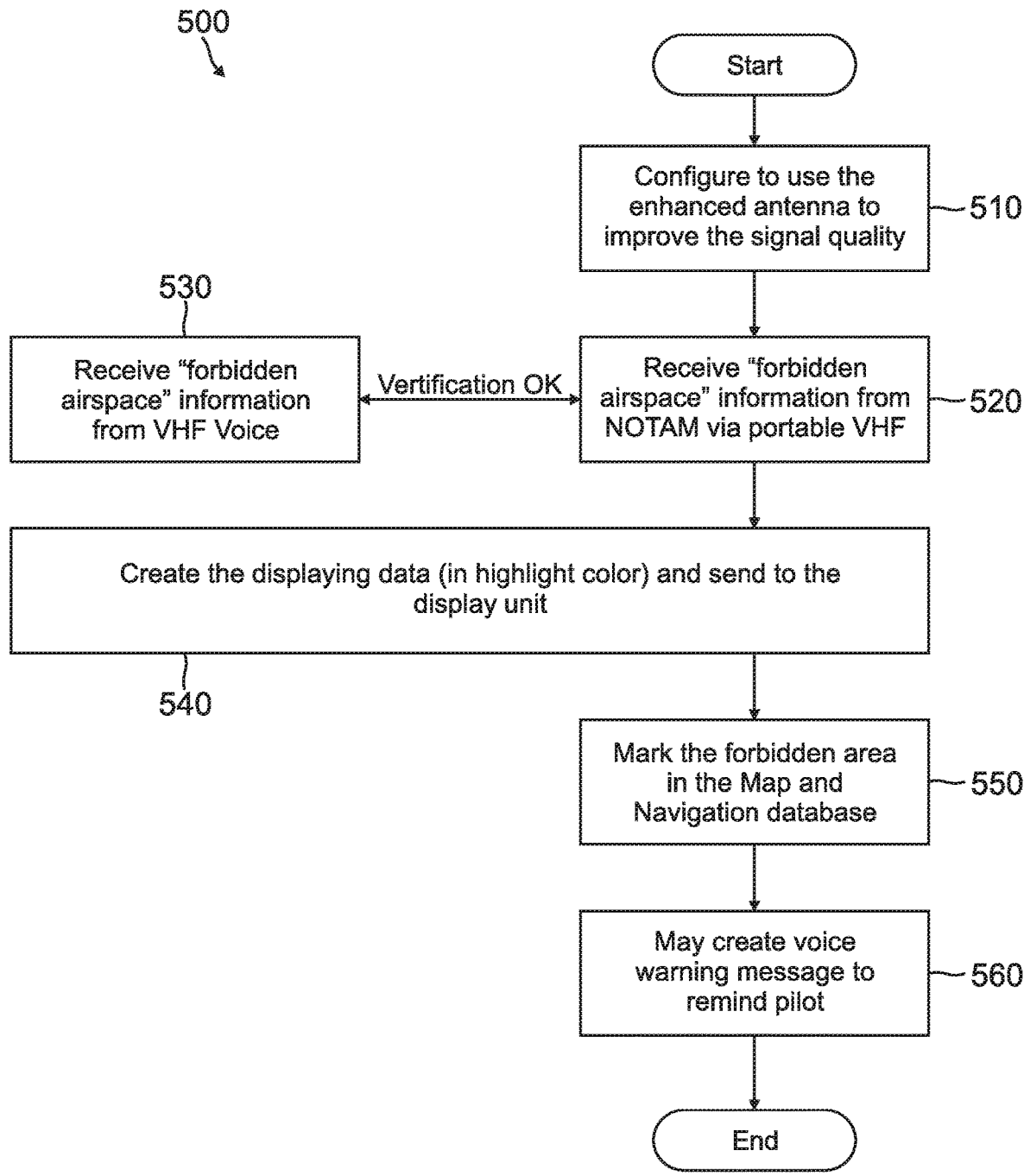
FIG. 5 is a flow diagram of a method to implement a procedure to identify forbidden airspace via a system for overhearing communications.

For example, FIG. 5 is a flow diagram of a method 500 to implement a procedure to identify forbidden airspace via a system for overhearing communications, such as those described previously. At the start, the system is configured to use an enhanced antenna to secure and improve the received signal quality (block 510). For example, the switchable RF antenna unit described previously can be implemented with control logic that uses historical experiences or some other information for antenna control.

During flight, a forbidden airspace information message is received via datalink from NOTAM through a portable VHF radio (block 520) and also from a VHF voice message (block 530), with a cross-check for verification to determine that the information is accurate ("OK"). Thereafter, method 500 creates the displaying data information (e.g., in a highlight color") and sends the displaying data information to the display unit (block 540). The forbidden airspace is then presented on a flight map or navigation map in the highlight color on the display unit (block 550). Optionally, a voice warning message may be created and presented to the pilot in terms of the distance to the forbidden airspace as a reminder (block 560).

Figure 6:
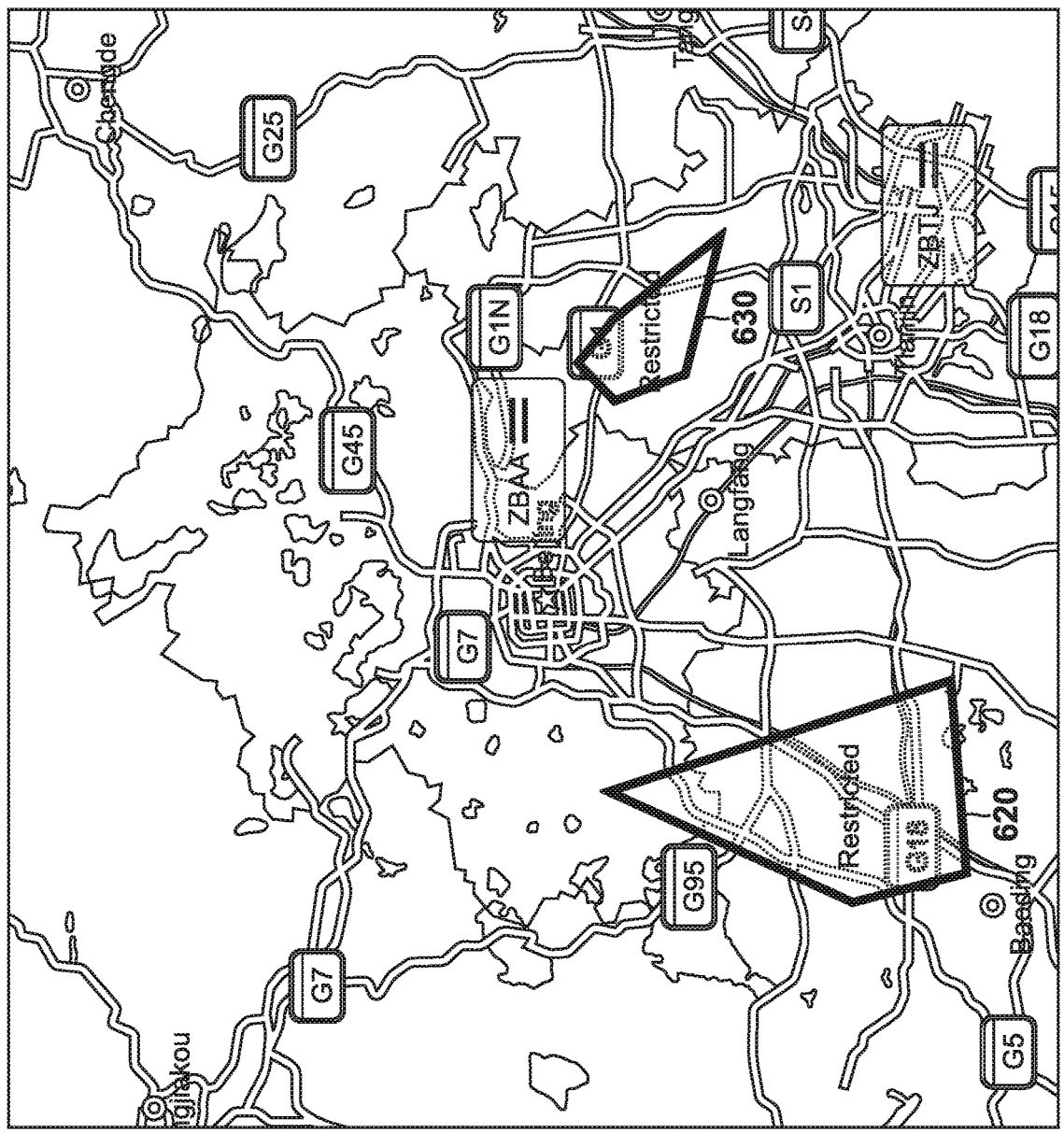
FIG. 6 depicts an example of restricted or forbidden airspace presented and highlighted on a map shown on a display unit in a two-dimensional mode.

FIG. 6 illustrates an example of restricted or forbidden airspace presented and highlighted on a map 610 shown on a display unit of a mobile computing device. The airspace may be defined as "restricted" or "forbidden" by NOTAM, like as follows:

A3551/15 NOTAMN
Q) ZXXX/QRTCA/IV/BO/W/000/999/2604N11412E016
A) ZSIIA
B) 1512091640
C) 1512311729
E) A TEMPORARY RESTRICTED AREA ESTABLISHED BOUNDED BY: N2608E11429-N2615E11400-N2559E11356-N2552E11425 BACK TO START

Figure 7:
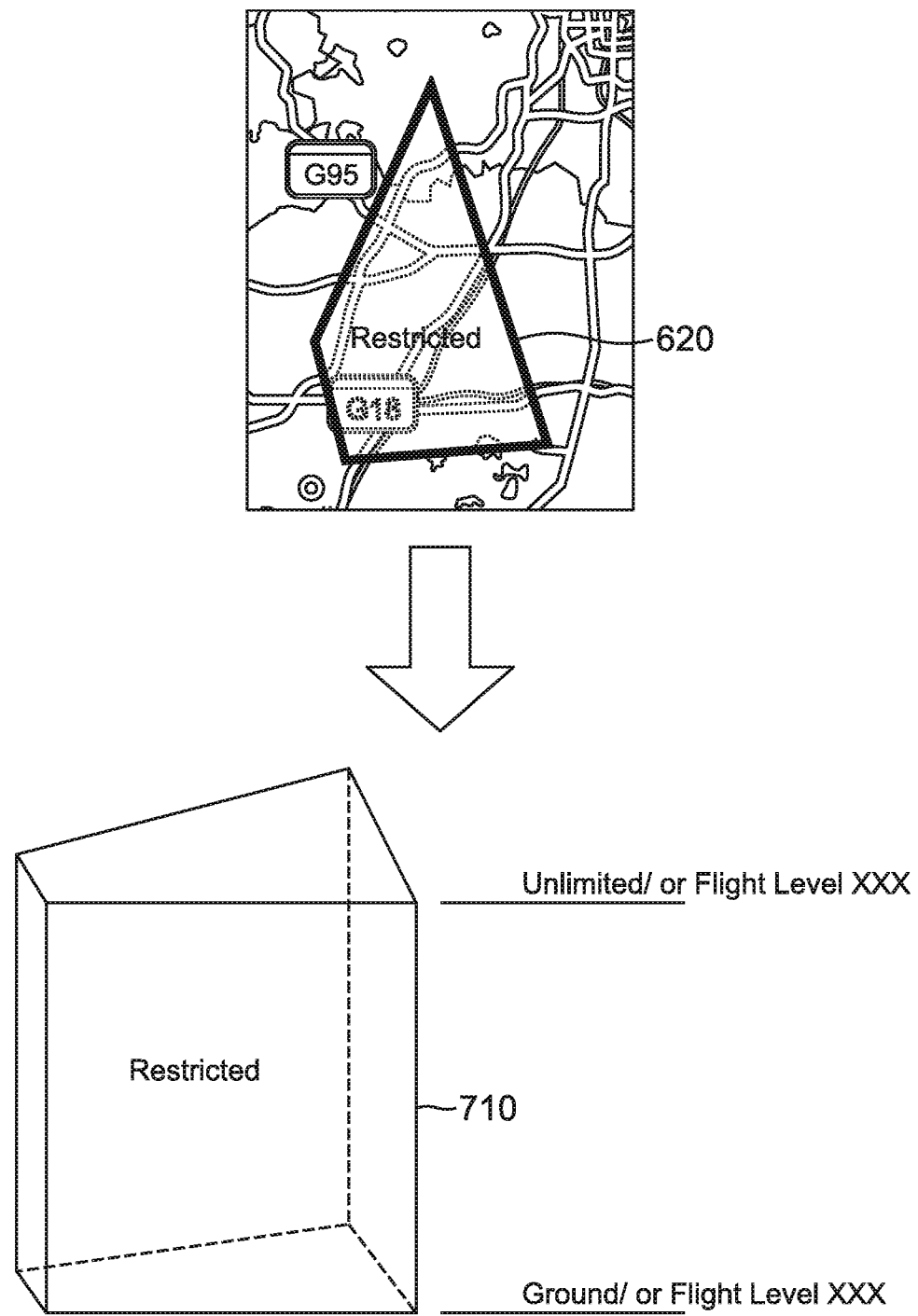
FIG. 7 illustrates an example of how a restricted airspace from the map of FIG. 6 can be implemented and displayed in a three-dimensional mode.

The map 610 depicts and highlights two restricted airspace regions 620 and 630, which are displayed in a two-dimensional top view mode. Alternatively, the restricted airspace regions can also be implemented and displayed in a three-dimensional mode. As shown in FIG. 7, for example, the restricted airspace region 620 can be reconfigured to a three-dimensional mode 710, which includes information on the ground or lower flight level XXX and on an unlimited or upper flight level XXX of the restricted airspace region.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a system for overhearing data or voice communications, the system comprising: at least one antenna operative to receive messages comprising data messages or voice messages, or both data and voice messages; a radio unit in communication with the at least one antenna, the radio unit operative to receive signals corresponding to the messages from the at least one antenna; a processor unit in communication with the radio unit, the processor unit operative to process the signals corresponding to the messages; and a display unit in communication with the processor unit, the display unit operatively enabled in response to the signals corresponding to the messages, the display unit operative to show the messages in a text format or a graphics format.

Example 2 includes the system of Example 1, wherein the at least one antenna, the radio unit, the processor unit, and the display unit are all implemented in a mobile computing device.

Example 3 includes the system of Example 2, wherein the at least one antenna is built into the mobile computing device, and the radio unit comprises a software defined radio.

Example 4 includes the system of Example 1, further comprising a selectable interface in communication with the radio unit, wherein the processor unit and the display unit are implemented in a mobile computing device, and the selectable interface provides a communication connection between the radio unit and the mobile computing device.

Example 5 includes the system of Example 4, wherein the radio unit comprises a very high frequency (VHF) radio, a satellite communications (SATCOM) radio, or a high frequency (HF) radio.

Example 6 includes the system of any of Examples 4-5, wherein the communication connection comprises an audio connection, a universal serial bus (USB) connection, or a short-range wireless connection.

Example 7 includes the system of any of Examples 1-6, further comprising a switchable radio frequency (RF) antenna unit that includes control logic for situational switching between the at least one antenna and one or more relay antennas based on a geographical or interference scenario.

Example 8 includes the system of Example 7, wherein the one or more relay antennas comprise a flexible antenna embedded in cockpit glass of an aircraft.

Example 9 includes the system of any of Examples 5-8, wherein the radio unit comprises an onboard aviation radio.

Example 10 includes the system of Example 9, further comprising an onboard aviation communication management unit (CMU) in operative communication with the onboard aviation radio, wherein the onboard aviation CMU is configured to receive SATCOM signals, HF signals, or other media signals.

Example 11 includes the system of Example 10, wherein information is processed and sent from the onboard aviation CMU to the onboard aviation radio tuned to an appropriate channel for transmission of the information to the mobile computing device.

Example 12 includes the system of any of Examples 1-11, wherein the display unit is operative to show any received data message or voice message as an overlay on a geographical map.

Example 13 includes the system of any of Examples 1-12, wherein a voice message received by the radio unit is recognized by the processor unit, which enables the display unit to show information from the voice message in a specified format.

Example 14 includes the system of any of Examples 1-13, wherein the processor unit is operative to execute an information message enhancement protocol using an embedded algorithm that is configurable to overhear a data or voice message that is: for a specified sky area and broadcast from a ground station; from a specified aircraft other than where the processor unit resides; from an aircraft where the processor unit resides; or a specific message type.

Example 15 includes the system of Example 14, wherein the specific message type comprises ARINC 618 messages, ARINC 623 air traffic service (ATS) messages, notice to airmen (NOTAM) messages, meteorological aviation reports, airport terminal information services (ATIS) messages, or airline unique messages defined by a database.

Example 16 includes the system of any of Examples 14-15, wherein the processor is configured to: automatically determine an appropriate frequency for receiving the message by using current position information; and tune the radio unit to the appropriate frequency.

Example 17 includes the system of any of Examples 1-16, wherein the processor unit is configured to execute a verification and safety enhancement protocol using an embedded algorithm that includes priority decision and cross check logic between a received data message and a received voice message, which provides a decision on which of the received messages to follow, or triggers a report that is sent to a ground station for a further decision.

Example 18 includes a system for overhearing data or voice communications, the system comprising: at least one antenna operative to receive messages comprising data messages or voice messages, or both data and voice messages; an aeronautical radio in communication with the at least one antenna, the aeronautical radio operative to receive the messages from the at least one antenna, the aeronautical radio comprising a VHF radio, a SATCOM radio, or a high frequency HF radio; a selectable interface in communication with the aeronautical radio, the selectable interface operative to receive signals corresponding to the messages; and a mobile computing device in communication with the aeronautical radio through the selectable interface, the mobile computing device operative to receive the signals corresponding to the messages from the selectable interface, the mobile computing device comprising a processor unit operative to process the signals corresponding to the messages, and a display unit in communication with the processor unit, the display unit operatively enabled in response to the signals corresponding to the messages, the display unit operative to show the messages in a text format or a graphics format.

Example 19 includes the system of Example 18, wherein the mobile computing device comprises a tablet computer.

Example 20 includes a mobile computing device for overhearing data or voice communications, comprising: a software defined radio operative to receive signals corresponding to messages comprising data messages or voice messages, or both data and voice messages, from at least one antenna in an aviation bandwidth; a processor unit in communication with the software defined radio, the processor unit operative to process the signals corresponding to the messages; and a display unit in communication with the processor unit, the display unit operatively enabled in response to the signals corresponding to the messages, the display unit operative to show the messages in a text format or a graphics format.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for overhearing data or voice communications, the system comprising:
   at least one antenna operative to receive messages that are transmitted between a ground station and an aircraft, as well as messages that are transmitted between one aircraft and another aircraft, wherein the messages comprise data messages or voice messages, or both data and voice messages;
   a portable radio including a radio receiver in communication with the at least one antenna, the portable radio operative to receive signals corresponding to the messages from the at least one antenna; and
   a mobile computing device in direct communication with the portable radio, the mobile computing device operative to receive the signals corresponding to the messages, the mobile computing device comprising:
      a processor operative to process the signals corresponding to the messages; and
      a display in communication with the processor, the display operatively enabled in response to the signals corresponding to the messages, the display operative to show the messages in a text format or a graphics format;
   wherein the processor is configured to execute a verification and safety enhancement protocol using an embedded algorithm that includes priority decision and cross check logic between a received data message and a received voice message, which provides a decision on which of the received messages to follow, or triggers a report that is sent to the ground station for a further decision.

2. The system of claim 1, further comprising a selectable interface in communication with the portable radio, wherein the selectable interface provides a communication connection between the portable radio and the mobile computing device.

3. The system of claim 2, wherein the portable radio comprises a very high frequency (VHF) radio, a satellite communications (SATCOM) radio, or a high frequency (HF) radio.

4. The system of claim 2, wherein the communication connection comprises an audio connection, a universal serial bus (USB) connection, or a short-range wireless connection.

5. The system of claim 1, further comprising a switchable radio frequency (RF) antenna unit that includes control logic for situational switching between the at least one antenna and one or more relay antennas based on a geographical or interference scenario.

6. The system of claim 5, wherein the one or more relay antennas comprise a flexible antenna embedded in cockpit glass of an aircraft.

7. The system of claim 3, wherein the portable radio comprises an onboard aviation radio.

8. The system of claim 7, further comprising an onboard aviation communication management unit (CMU) in operative communication with the onboard aviation radio, wherein the onboard aviation CMU is configured to receive satellite communications (SATCOM) signals, high frequency (HF) signals, or other media signals.

9. The system of claim 8, wherein information is processed and sent from the onboard aviation CMU to the onboard aviation radio tuned to an appropriate channel for transmission of the information to the mobile computing device.

10. The system of claim 1, wherein the display is operative to show any received data message or voice message as an overlay on a geographical map.

11. The system of claim 1, wherein a voice message received by the portable radio is recognized by the processor, which enables the display to show information from the voice message in a specified format.

12. The system of claim 1, wherein the processor is operative to execute an information message enhancement protocol using an embedded algorithm that is configurable to overhear a data or voice message that is:
   for a specified sky area and broadcast from the ground station;
   from a specified aircraft other than where the processor resides;
   from an aircraft where the processor resides; or
   a specific message type.

13. The system of claim 12, wherein the specific message type comprises ARINC 618 messages, ARINC 623 air traffic service (ATS) messages, notice to airmen (NOTAM) messages, meteorological aviation reports, airport terminal information services (ATIS) messages, or airline unique messages defined by a database.

14. The system of claim 12, wherein the processor is configured to:
   automatically determine an appropriate frequency for receiving the message by using current position information; and
   tune the portable radio to the appropriate frequency.

15. A system for overhearing data or voice communications, the system comprising:

an avionics system comprising:
  an onboard aviation radio; and
  an onboard aviation datalink communication management unit (CMU) in operative communication with the aviation radio, the CMU configured to receive satellite communications (SATCOM) signals from a SATCOM receiver, high frequency (HF) signals from an HF receiver, or other media signals from one or more other media receivers, the received signals corresponding to messages comprising data messages or voice messages, or both data and voice messages;
  wherein the received signals are sent from the aviation datalink CMU to the aviation radio for transmission;
a switchable radio frequency (RF) antenna unit that includes control logic for situational switching between at least one antenna, coupled to the avionics system, and one or more relay antennas based on a geographical or interference scenario; and
a portable hearing system comprising:
  a selectable interface in communication with the aviation radio, the selectable interface operative to receive signals transmitted from the aviation radio corresponding to the messages; and
  a mobile computing device in communication with the aviation radio through the selectable interface, the mobile computing device operative to receive the signals corresponding to the messages from the selectable interface, the mobile computing device comprising:
    a processor operative to process the signals corresponding to the messages; and
    a display in communication with the processor, the display operatively enabled in response to the signals corresponding to the messages, the display operative to show the messages in a text format or a graphics format;
    wherein the processor is configured to execute a verification and safety enhancement protocol using an embedded algorithm that includes priority decision and cross check logic between a received data message and a received voice message, which provides a decision on which of the received messages to follow, or triggers a report that is sent to a ground station for a further decision.

16. The system of claim 15, wherein the mobile computing device comprises a tablet computer.

17. A mobile computing device for overhearing data or voice communications, comprising:
  a software defined radio operative to receive signals corresponding to messages comprising data messages or voice messages, or both data and voice messages, from at least one antenna in an aviation bandwidth;
  a processor in communication with the software defined radio, the processor operative to process the signals corresponding to the messages; and
  a display in communication with the processor, the display operatively enabled in response to the signals corresponding to the messages, the display operative to show the messages in a text format and a graphics format;
  wherein the processor is configured to execute a verification and safety enhancement protocol using an embedded algorithm that includes priority decision and cross check logic between a received data message and a received voice message, which provides a decision on which of the received messages to follow, or triggers a report that is sent to a ground station for a further decision.

18. The system of claim 1, wherein the processor is operative to execute an information message enhancement protocol that is configurable to overhear a data or voice message comprising a forbidden airspace information message defining a restricted airspace region.

* * * * *